United States Patent
Shoji et al.

(10) Patent No.: US 8,659,204 B2
(45) Date of Patent: Feb. 25, 2014

(54) STATOR WITH INTERPHASE INSULATION SHEET

(75) Inventors: Yutaka Shoji, Wako (JP); Takuo Nozawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 13/301,788

(22) Filed: Nov. 22, 2011

(65) Prior Publication Data

US 2012/0133238 A1    May 31, 2012

(30) Foreign Application Priority Data

Nov. 26, 2010  (JP) .................................. 2010-264203

(51) Int. Cl.
*H02K 3/34* (2006.01)
*H02K 3/487* (2006.01)

(52) U.S. Cl.
USPC .............................. 310/215; 310/214; 310/260

(58) Field of Classification Search
USPC ........................... 310/214, 215, 260, 194, 270
IPC ............................. H02K 3/32,3/34, 3/38, 3/487
See application file for complete search history.

(56) References Cited

U.S. PATENT DOCUMENTS 3,679,926 A * 7/1972 Simmonds et al. ........... 310/214
7,122,936 B2 * 10/2006 Takizawa et al. ............. 310/260

FOREIGN PATENT DOCUMENTS

| JP | 58046843 A | * | 3/1983 | ............... H02K 3/38 |
|---|---|---|---|---|
| JP | 59-13057 U | | 1/1984 | |
| JP | 05-84155 U | | 11/1993 | |
| JP | 2005-020942 | | 1/2005 | |
| JP | 2005-110492 | | 4/2005 | |
| JP | 4461820 B2 | | 8/2005 | |
| JP | 2005-312222 | | 11/2005 | |
| JP | 2011234429 A | * | 11/2011 | |

OTHER PUBLICATIONS

Machine Translation, JP 2011234429 A, Nov. 17, 2011.*
Machine Translation, JP 05-084155 U, Nov. 12, 1993.*
Japanese Office Action for corresponding JP Application No. 2010-264203, Oct. 17, 2012.

* cited by examiner

Primary Examiner — Tran Nguyen
Assistant Examiner — Thomas Truong
(74) Attorney, Agent, or Firm — Ditthavong Mori & Steiner, P.C.

(57) ABSTRACT

A stator includes a stator core, slots, coils, an interphase insulation sheet, and wedges. The interphase insulation sheet is provided between coil ends of adjacent coils having different phases among the coils. The interphase insulation sheet includes a first sheet body portion, a second sheet body portion, and a first bridge portion. The first and second sheet body portions respectively have first and second retaining pieces. The first retaining piece projects from the first sheet body portion toward the second sheet body portion in the developed state of the interphase insulation sheet. The second retaining piece projects from the second sheet body portion toward the first sheet body portion in the developed state of the interphase insulation sheet. The first and second retaining pieces are retained by projecting portions of the wedges.

12 Claims, 6 Drawing Sheets

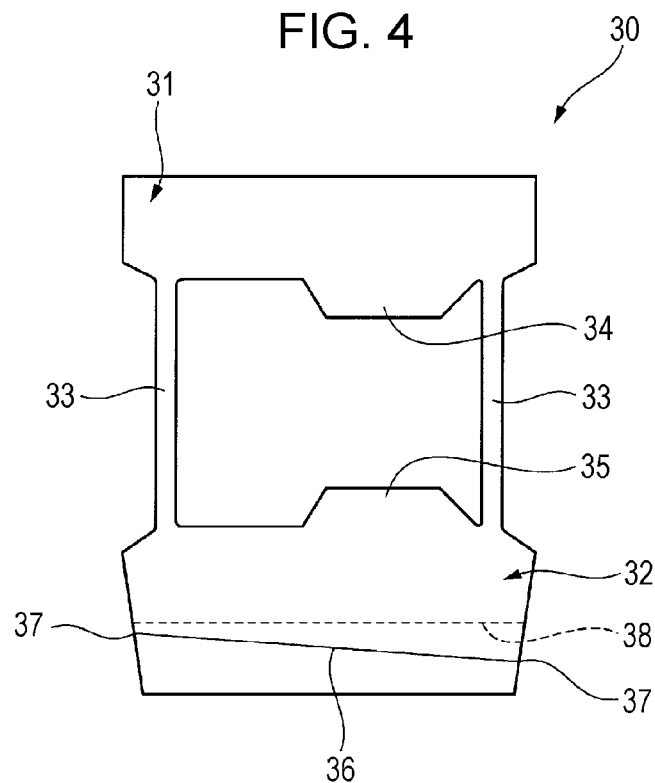
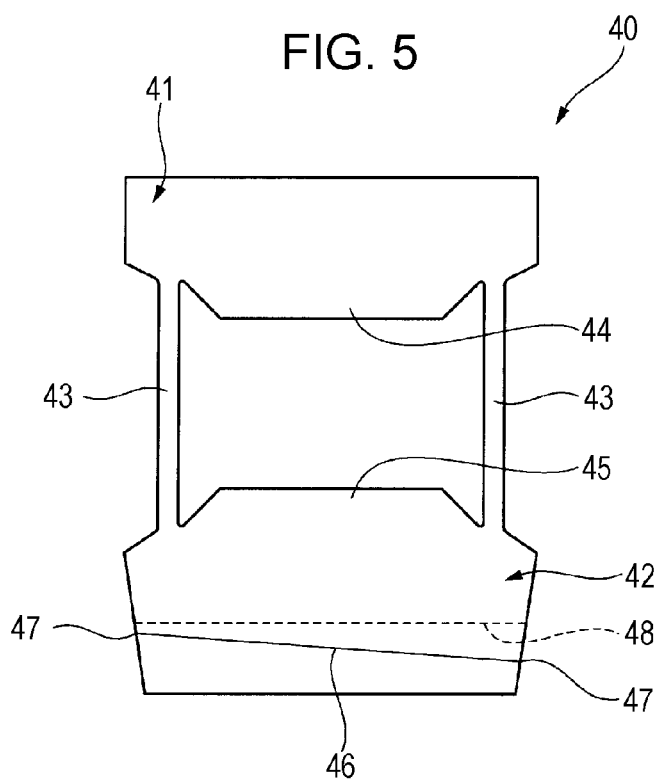

US 8,659,204 B2

STATOR WITH INTERPHASE INSULATION SHEET

CROSS-REFERENCE TO RELATED APPLICATIONS

The present application claims priority under 35 U.S.C. §119 to Japanese Patent Application No. 2010-264203, filed Nov. 26, 2010, entitled "Stator." The contents of this application are incorporated herein by reference in their entirety.

BACKGROUND OF THE INVENTION

1. Field of the Invention

The present invention relates to a stator.

2. Discussion of the Background

Japanese Patent 4461820 discloses a stator in which insulation paper is provided between coils corresponding to different phases at end faces of a stator core in the rotation axis direction. The insulation paper adopted in the stator is assembled by bonding nose portions to flat portions.

SUMMARY OF THE INVENTION

According to one aspect of the present invention, a stator comprises a stator core, slots, coils, an interphase insulation sheet, and wedges. The stator core has a plurality of teeth. The slots are provided between the teeth. The coils have a plurality of phases. Each of the coils is wound in the slots. The interphase insulation sheet is provided between coil ends of adjacent coils having different phases among the coils. The wedges are provided in the slots on an inner peripheral side of the stator core. Each of the wedges has projecting portions protruding from first and second end faces of the stator core in a rotation axis direction. The interphase insulation sheet includes a first sheet body portion, a second sheet body portion, and a first bridge portion. The first sheet body portion is provided on an outer side of the first end face of the stator core in the rotation axis direction. The second sheet body portion is provided on an outer side of the second end face of the stator core in the rotation axis direction. The first bridge portion links the first sheet body portion to the second sheet body portion. The first and second sheet body portions have first and second retaining pieces respectively provided in opposing inner portions of the first and second sheet body portions in a developed state of the interphase insulation sheet. The first retaining piece projects from the first sheet body portion toward the second sheet body portion in the developed state of the interphase insulation sheet. The second retaining piece projects from the second sheet body portion toward the first sheet body portion in the developed state of the interphase insulation sheet. The first and second retaining pieces are retained by the projecting portions of the wedges when the first and second sheet body portions are attached to the stator core to cover the coil ends.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is a developed view of an interphase insulation sheet provided between coil ends of a U-phase coil and a V-phase coil in the embodiment.

FIG. 5 is a developed view of an interphase insulation sheet provided between coil ends of a V-phase coil and a W-phase coil in the embodiment.

DESCRIPTION OF THE EMBODIMENTS

Figure 1:
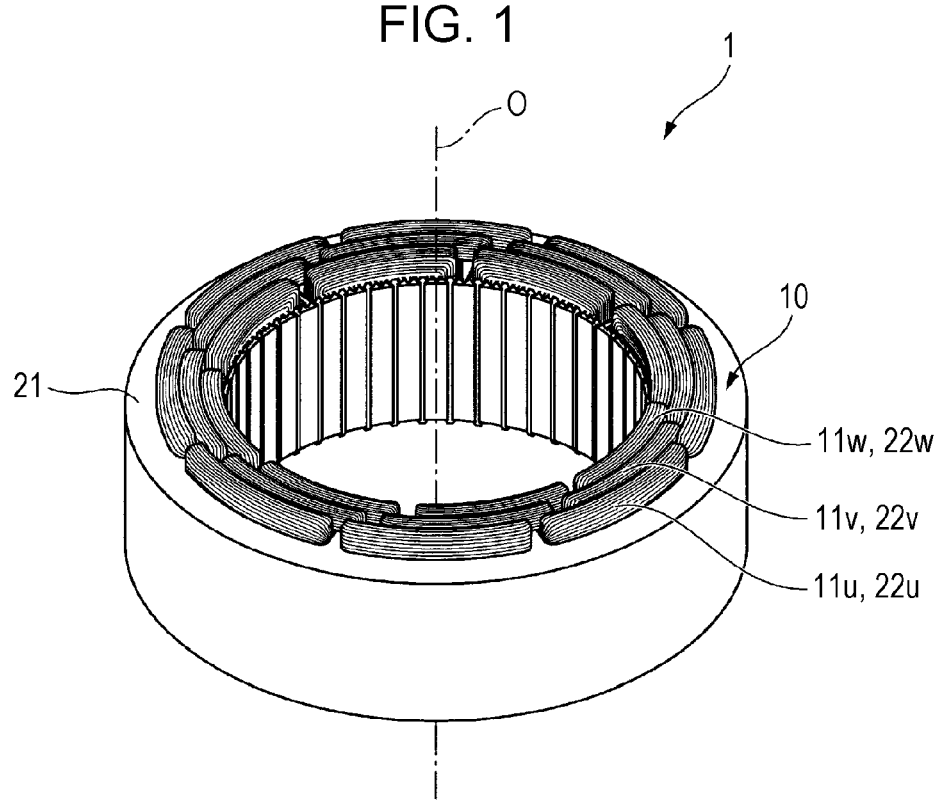
FIG. 1 is a perspective view of a stator according to an embodiment of the present invention.

A stator according to an embodiment of the present invention includes a stator core (e.g., a stator core 10 in an embodiment) having a plurality of teeth (e.g., teeth 16 in the embodiment); a plurality of slots (e.g., slots 18 in the embodiment) provided between the adjacent teeth; coils of a plurality of phases (e.g., U-phase coils 11$u$, V-phase coils 11$v$, and W-phase coils 11$w$ in the embodiment) wound in the slots; interphase insulation sheets (e.g., interphase insulation sheets 30, 40 in the embodiment) provided between coil ends (e.g., coil ends 22$u$, 22$v$, and 22$w$ in the embodiment) of the adjacent coils of different phases, of the coils of the plurality of phases; and wedges (e.g., wedges 60 in the embodiment) provided in the slots on an inner peripheral side of the stator core. The wedges have projecting portions (e.g., projecting portions 61 in the embodiment) protruding from both outer end faces of the stator core in a rotation axis direction. Each of the interphase insulation sheets includes a pair of sheet body portions (e.g., sheet body portions 31 and 32, sheet body portions 41, 42 in the embodiment) provided on an outer side of one (e.g., an end face 21 in the embodiment) of the end faces of the stator core in the rotation axis direction and an outer side of the other end face, and a bridge portion (e.g., a bridge portion 33, 43 in the embodiment) that links the sheet body portions. The sheet body portions have retaining pieces (e.g., retaining pieces 34, 35, 44, 45 in the embodiment) provided in opposing inner portions of the sheet body portions in a developed state of the interphase insulation sheet, one of the retaining pieces projecting from one of the sheet body portions toward the other sheet body portion and the other retaining piece projecting from the other sheet body portion toward the one sheet body portion. The retaining pieces are retained by the projecting portions of the wedges when the sheet body portions are attached to the stator core so as to cover the coil ends.

In this case, since the retaining pieces provided in the sheet body portions of the interphase insulation sheet are retained by the projecting portions of the wedges, isolation between the coil ends of the adjacent coils of different phases can be ensured. Further, since the bonding step of the interphase insulation paper and the folding step of the nose portions in the related art are omitted, the tact time can be shortened.

In addition, since the interphase insulation sheet can conform to the shapes of the coil ends located on the outer sides of the end faces of the stator core by simply inserting the bridge portions in the slots, the interphase insulation sheet can be prevented from being displaced when the coils are inserted in the slots.

Preferably, one of the sheet body portions provided on an outer peripheral side of the stator core has a folded portion (e.g., a folded portion 36, 46 in the embodiment) to be folded toward the corresponding end face of the stator core.

In this case, since the interphase insulation sheet can conform to the outer shapes of the coil ends located on the outer sides of the end faces of the stator core, it can be prevented from being caught in the coils when the coils are inserted in the slots. This allows the coils of the different phases to be isolated more reliably.

Preferably, the folded portion is inclined such that one end of the folded portion in a circumferential direction of the stator core is shifted from the other end in a radial direction of the stator core.

In this case, when a plurality of interphase insulation sheets are provided adjacent to each other in the circumferential direction of the stator, interference of folded portions of the interphase insulation sheets can be avoided. Therefore, the interphase insulation sheets can keep conforming to the outer shapes of the coil ends, and can be more reliably prevented from being caught in the coils.

Preferably, the projecting portions of the wedges have tapered portions (e.g., tapered portions 62 in the embodiment) that decrease in length from the inner peripheral side toward the outer peripheral side of the stator core.

In this case, since the projecting portions of the wedges have the tapered portions, the retaining pieces of the sheet body portions are easily and reliably retained by the projecting portions such as to be caught inward. This allows the interphase insulation sheet to be easily positioned relative to the coil ends.

Preferably, a frictional coefficient of a surface of the interphase insulation sheet to be in contact with the coil end of the coil inserted earlier is higher than a frictional coefficient of a surface of the interphase insulation sheet to be in contact with the coil end of the coil inserted later.

In this case, when the coils are inserted in the slots, since the frictional coefficient of the surface to be in contact with the coil end of the coil inserted earlier is higher, the interphase insulation sheet can be prevented from being displaced when the coil end of the coil inserted later moves.

Preferably, the sheet body portions have an easily breakable line (e.g., perforations 38, 48 in the embodiment) that allows easy cutting of portions which are not used for isolation between the coils of the phases.

In this case, since the portions of the sheet body portions that do not contribute to isolation between the coil ends of the different phases can be cut off after the coils are wound in the slots, radiation performance of the coils can be enhanced.

The embodiments will now be described with reference to the accompanying drawings, wherein like reference numerals designate corresponding or identical elements throughout the various drawings.

A stator according to an embodiment of the present invention will now be described with reference to the drawings.

FIG. 1 illustrates a stator 1 according to the embodiment. This stator 1 is provided for an inner rotor type motor such as a DC brushless motor, and includes a substantially annular stator core 10. U-phase coils 11*u*, V-phase coils 11*v*, and W-phase coils 11*w* are wound on the stator core 10. On an inner side of the stator core 10, a rotor (not illustrated) for the motor is provided. In the following description, a direction along a rotation shaft O of the rotor is simply referred to as a rotation axis direction.

Figure 2:
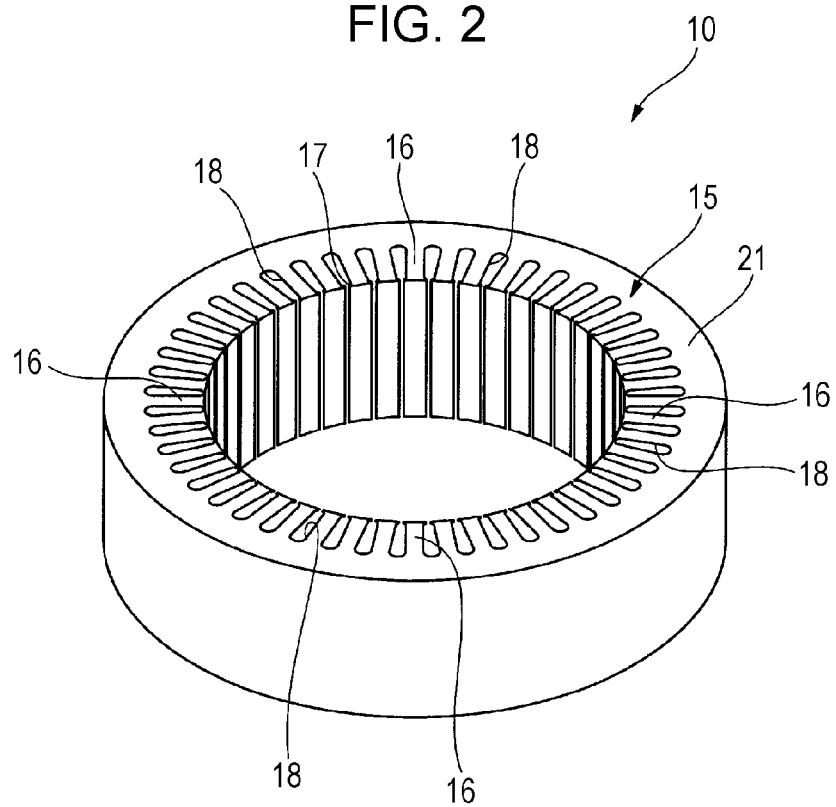
FIG. 2 is a perspective view of a stator core according to the embodiment.

As illustrated in FIG. 2, the stator core 10 includes a substantially annular yoke portion 15, and a plurality of teeth 16 provided on an inner periphery of the yoke portion 15. The teeth 16 extend inward in a radial direction and are arranged in a comb form. At radial inner ends of the teeth 16, retaining portions 17 are provided to slightly widen to both sides in a circumferential direction. A plurality of slots 18 are provided between the adjacent teeth 16, and U-phase coils 11*u*, V-phase coils 11*v*, and W-phase coils 11*w* are inserted in the slots 18.

Figure 3:
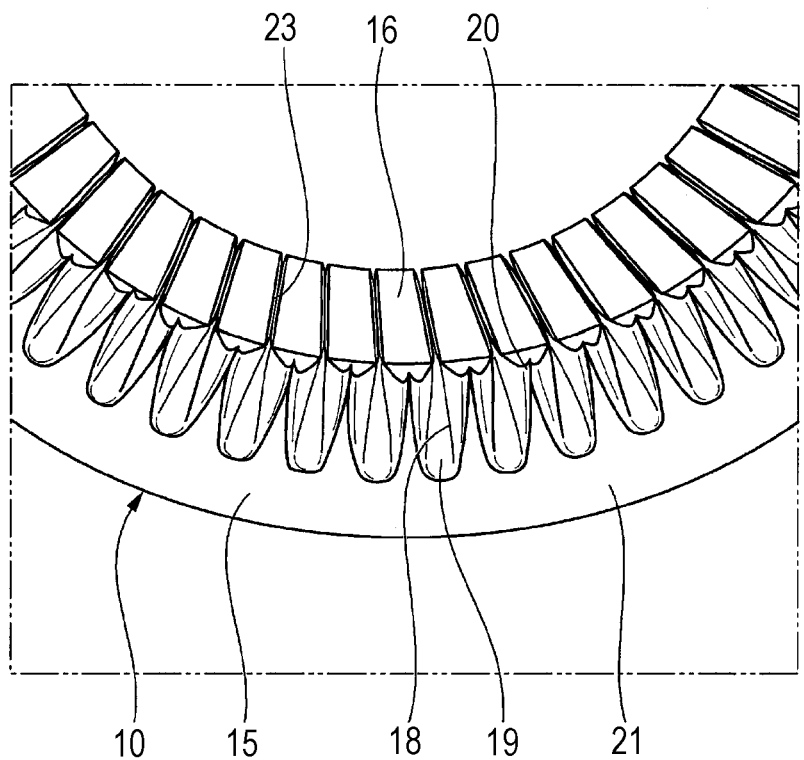
FIG. 3 is a perspective view of the stator core to which slot insulation sheets are attached.

The above-described stator 1 is provided with slot insulation sheets 19 that isolate the U-phase coils 11*u*, V-phase coils 11*v*, and W-phase coils 11*w* from the stator core 10. As illustrated in FIG. 3, each of the slot insulation sheets 19 is fitted in the corresponding slot 18 in a curved state so as to cover wall surfaces of two adjacent teeth 16. End portions 20 of the slot insulation sheets 19 slightly protrude from both end faces 21 of the stator core 10 in the rotation axis direction. The protruding end portions 20 are folded back toward the end faces 21, whereby the slot insulation sheets 19 are prevented from being displaced in the rotation axis direction. In the U-phase coils 11*u*, V-phase coils 11*v*, and W-phase coils 11*w*, the U-phase coils 11*u* and the V-phase coils 11*v* are adjacent to each other, and the V-phase coils 11*v* and the W-phase coils 11*w* are adjacent to each other.

FIG. 4 is a developed view of a planar interphase insulation sheet 30 that isolates coil ends 22*u* of a U-phase coil 11*u* and coil ends 22*v* of a V-phase coil 11*v* inserted in the corresponding slot 18, which are located on outer sides in the rotation axis direction of the end faces 21 of the stator core 10 (see FIG. 1), and coil ends 22*v* of a V-phase coil 11*v* which are located on the outer sides in the rotation axis direction of the end faces 21 of the stator core 10 (see FIG. 1). FIG. 5 is a developed view of a planar interphase insulation sheet 40 that isolates the coil ends 22*v* of the V-phase coil 11*v* and coil ends 22*w* of a W-phase coil 11*w* located on the outer sides in the rotation axis direction of the end faces 21 of the stator core 10.

The interphase insulation sheet 30 includes a pair of sheet body portions 31 and 32 and two parallel bridge portions 33. In a state in which the interphase insulation sheet 30 is attached to the stator core 10, the sheet body portions 31 and 32 are respectively located on the outer sides of one end face 21 and the other end face 21 of the stator core 10 in the rotation axis direction. The bridge portions 33 are shaped like narrow bands so as to link the sheet body portions 31 and 32. Similarly, the interphase insulation sheet 40 includes a pair of sheet body portions 41 and 42 and two parallel bridge portions 43. In a state in which the interphase insulation sheet 40 is attached to the stator core 10, the sheet body portions 41 and 42 are respectively located on the outer sides of the one end face 21 and the other end face 21 of the stator core 10 in the rotation axis direction. The bridge portions 43 are shaped like narrow bands so as to link the sheet body portions 41 and 42. In the descriptions of the sheet body portions 31, 32, 41, and 42 of the interphase insulation sheets 30 and 40, a side where the bridge portions 33 and 43 are connected is referred to as an inner side, and the opposite side is referred to as an outer side. Further, a direction orthogonal to an inward-outward direction on the same plane as the sheet body portions 31, 32, 41, and 42, that is, a direction orthogonal to the bridge portions 33 is referred to as a circumferential direction of the stator core 10.

The sheet body portions 31 and 32 are inserted between the coil ends 22*u* of the U-phase coil 11*u* and the coil ends 22*v* of the V-phase coil 11v exposed from the one end face 21 and the other end face 21, and the sheet body portions 41 and 42 are inserted between the coil ends 22v of the V-phase coil 11v and the coil ends 22w of the W-phase coil 11w.

The sheet body portion 31 has a substantially trapezoidal retaining piece 34 that projects from an inner side of the sheet body portion 31 toward the sheet body portion 32. The sheet body portion 32 has a substantially trapezoidal retaining piece 35 that projects from an inner side of the sheet body portion 32 toward the sheet body portion 31. Similarly, the sheet body portion 41 has a substantially trapezoidal retaining piece 44 that projects from an inner side of the sheet body portion 41 toward the sheet body portion 42. The sheet body portion 42 has a substantially trapezoidal retaining piece 45 that projects from an inner side of the sheet body portion 42 toward the sheet body portion 41. The dimension of the retaining pieces 34 and 35 in the circumferential direction of the stator core 10 is set to be about half the dimension of the sheet body portions 31 and 32 in the circumferential direction. Further, the dimension of the retaining pieces 44 and 45 in the circumferential direction of the stator core 10 is set to be equivalent to the distance between the two bridge portions 43. The dimension of the retaining pieces 44 and 45 in the circumferential direction is about double the dimension of the retaining pieces 34 and 35 in the circumferential direction.

On outer sides of the sheet body portions 32 and 42, folded portions 36 and 46 are provided to be mountain-folded in a manner such as to project toward the end faces 21 of the stator core 10. The folded portions 36 and 46 allow outer portions of the sheet body portions 32 and 42 to be in contact with the coil ends 22u and 22v to conform to the outer shapes of the coil ends 22u and 22v.

One end portion 37 and the other end portion 37 of the folded portion 36 in the circumferential direction of the stator core 10 are shifted from each other in the inward-outward direction of the sheet body portion 32. That is, when the interphase insulation sheet 30 is set in the stator core 10, a folding line is inclined such that the one end portion 37 and the other end portion 37 are shifted from each other in the radial direction of the stator core 10.

Similarly, one end portion 47 of the folded portion 46 in the circumferential direction of the stator core 10 is shifted from the other end portion 47 in the inward-outward direction of the sheet body portion 42. That is, when the interphase insulation sheet 40 is set in the stator core 10, a folding line is inclined such that the one end portion 47 and the other end portion 47 are shifted from each other in the radial direction of the stator core 10.

The sheet body portions 32 and 42 have perforations 38 and 48 on inner sides of the above-described folded portions 36 and 46. The perforations 38 and 48 extend in the circumferential direction of the stator core 10. The perforations 38 and 48 allow the outer portions of the sheet body portions 32 and 42 including the above-described folded portions 36 and 46, which do not contribute to insulation, to be easily cut off after attachment of all of the U-phase coils 11u, the V-phase coils 11v, and the W-phase coils 11w is completed and the coil ends 22u to 22w are formed integrally.

After a U-phase coil 11u is inserted in a slot 18, the bridge portions 33 for linking the sheet body portions 31 and 32 are inserted in a predetermined slot 18 different from the slot 18 for the U-phase coil 11u, and are shifted to the radial outer side of the stator core 10 in the slot 18. The distance between the two bridge portions 33 is set to be slightly smaller than the outer dimension of the sheet body portions 31 and 32 so that the bridge portions 33 can fit in the slot 18 (this also applies to the bridge portions 43).

After a V-phase coil 11v is inserted in a slot 18, the bridge portions 43 for linking the sheet body portions 41 and 42 are inserted in a predetermined slot 18 different from the slot 18 for the V-phase coils 11v, and are shifted to the radial outer side of the stator core 10 in the slot 18.

Figure 11:
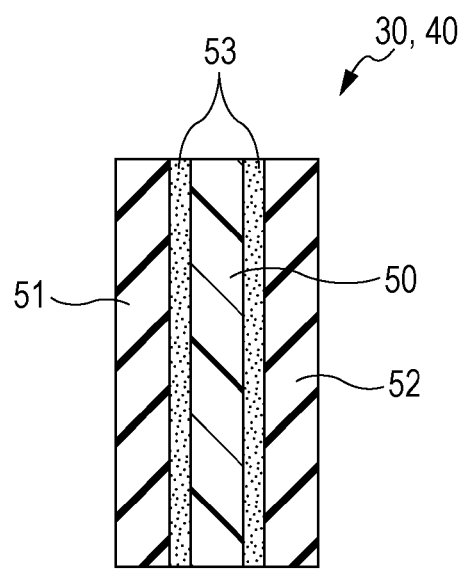
FIG. 11 is a longitudinal sectional view of each interphase insulation sheet.

As illustrated in FIG. 11, each of the interphase insulation sheets 30 and 40 has a three-layer structure including a base layer 50 and two functional layers 51 and 52. For example, the base layer 50 and the functional layers 51 and 52 are bonded by a dry lamination method. Reference numeral 53 denotes adhesive layers.

The base layer 50 has a function of providing voltage resistance and mechanical strength, and is formed of a polyethylene material.

The functional layers 51 and 52 form the outermost layers of the interphase insulation sheets 30 and 40. The functional layers 51 and 52 have a function of providing heat resistance and slippage for coil insertion, and are formed of aramid fiber as an example. To prevent the interphase insulation sheets 30 and 40 from being displaced by insertion of the V-phase coil 11v and the W-phase coil 11w, the frictional coefficient of an outer surface of the functional layer 51 of the interphase insulation sheet 30 to be in contact with a coil end 22u of a U-phase coil 11u inserted earlier is set to be higher than the frictional coefficient of an outer surface of the functional layer 52 to be in contact with a coil end 22v of a V-phase coil 11v inserted later. The frictional coefficient of an outer surface of the functional layer 51 of the interphase insulation sheet 40 to be in contact with a coil end 22v of a V-phase coil 11v inserted earlier is set to be higher than the frictional coefficient of an outer surface of the functional layer 52 to be in contact with a coil end 22w of a W-phase coil 11w inserted later.

Figure 6:
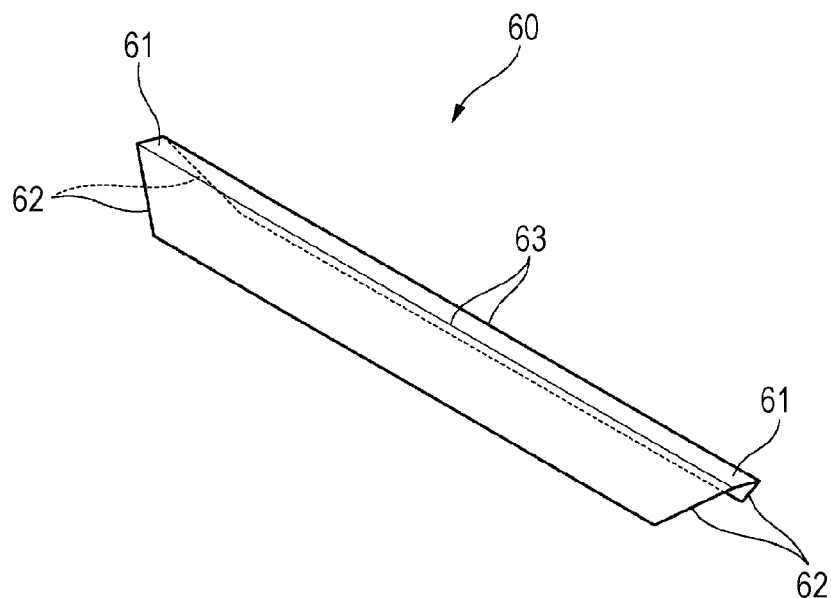
FIG. 6 is a perspective view of a wedge in the embodiment.
Figure 7:
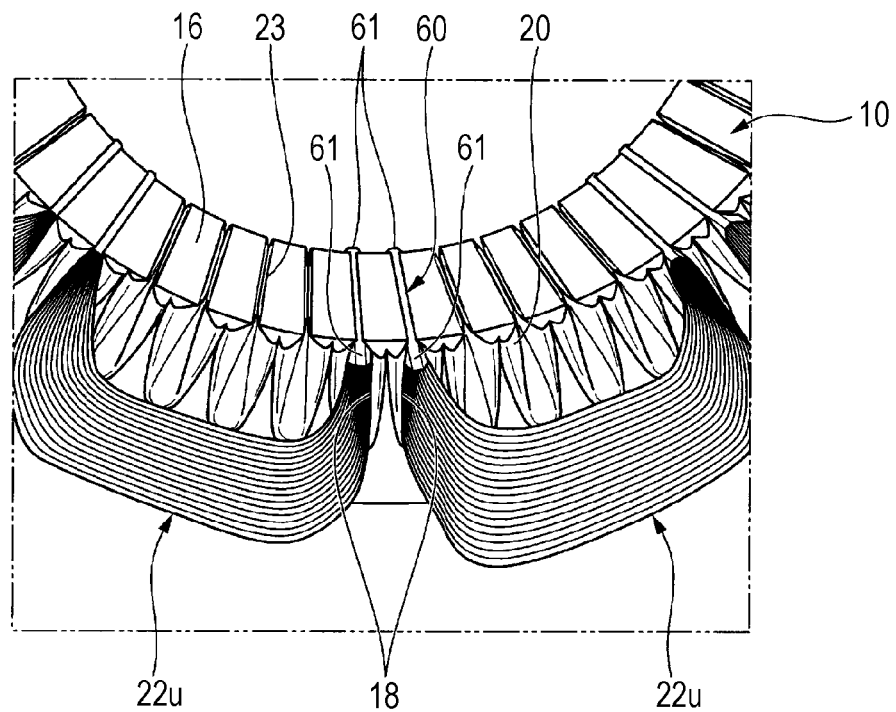
FIG. 7 is a perspective view illustrating a state in which U-phase coils are inserted and wedges are attached in the stator core.

FIG. 6 illustrates a wedge 60. The wedge 60 is inserted in the above-described slot 18, and is located on the radial innermost side in the slot 18 so as to close an opening 23 on the radial inner side of the slot 18 (FIG. 3). The wedge 60 is formed by folding a flat and belt-shaped insulation sheet (similar to the interphase insulation sheets 30 and 40) at almost the center in the width direction such that a ridge line thereof extends in the longitudinal direction. As illustrated in FIG. 7, the wedge 60 has a length such that projecting portions 61 project in the rotation axis direction from both end faces 21 of the stator core 10 when attached to the stator core 10. The projecting portions 61 have tapered portions 62 such that the length of the wedge 60, that is, the length in the projecting direction of the projecting portions 61 gradually decreases from the radial inner side toward the radial outer side when the wedge 60 is attached to the stator core 10. In FIG. 6, for example, the wedge 60 is folded along two folding lines 63. While only one end face 21 is illustrated in FIG. 7, one of the projecting portions 61 of the wedge 60 similarly projects from the other end face 21.

Next, a description will be given of a procedure for attaching the above-described interphase insulation sheets 30 and 40 with reference to FIGS. 7 to 10. In the embodiment, U-phase coils 11u, V-phase coils 11v, and W-phase coils 11w are inserted by so-called machine winding using a winding machine. In the case of machine winding, U-phase coils 11u, V-phase coils 11v, and W-phase coils 11w are sequentially inserted in slots 18 from one end face 21. FIGS. 7 to 10 illustrate the side where the U-phase coils 11u, the V-phase coils 11v, and the W-phase coils 11w are inserted. Since sheet body portions 31 and 32 are different only in that the sheet body portion 32 has a folded portion 36 and perforations (easily breakable line) 38, a description will be given only of a setting side of the sheet body portion 32 in which the U-phase coils 11u, the V-phase coils 11v, and the W-phase coils 11w are inserted.

As illustrated in FIG. 7, first, U-phase coils 11u are inserted in adjacent slots 18 so that coil ends 22 are routed at a distance from each other in the circumferential direction of the stator core 10. The same U-phase coils 11u are also simultaneously inserted in the next slots 18 but four, so that the coil ends 22u take an angular U-shape.

In the slots 18 where the U-phase coils 11u are inserted, wedges 60 are inserted to be located at positions shifted from the U-phase coils 11u to the radial inner side of the stator core 10. At this time, ridge lines of the wedges 60 are located on the radial inner side of the stator core 10.

Figure 8:
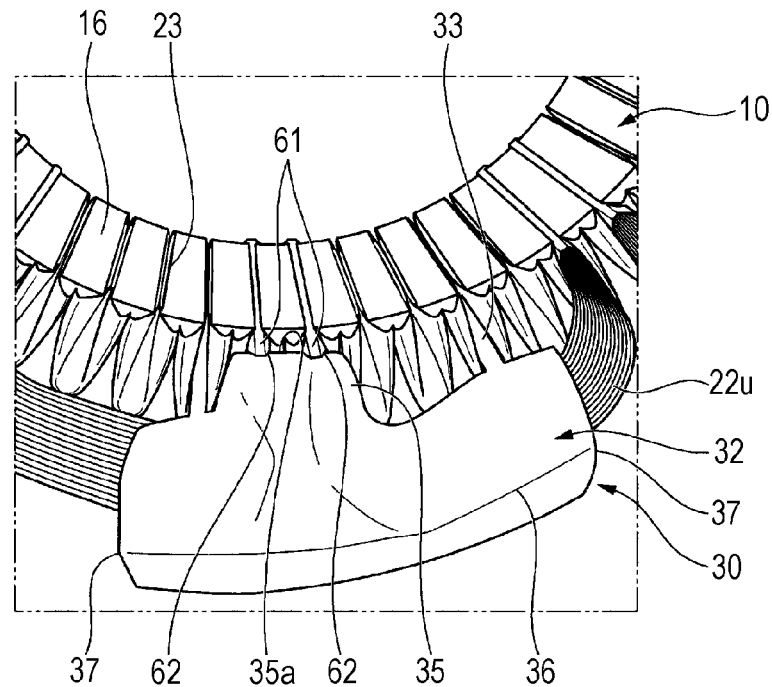
FIG. 8 is a perspective view illustrating a state in which an interphase insulation sheet to be provided between coil ends of a U-phase coil and a V-phase coil is attached.

Next, as illustrated in FIG. 8, an interphase insulation sheet 30 is attached to the stator core 10 so that a sheet body portion 32 mountain-folded at a folded portion 36 is located on a side where V-phase coils 11v are to be inserted. At this time, a retaining piece 35 of the sheet body portion 32 is located to oppose projecting portions 61 of the wedges 60, and bridge portions 33 are inserted in the slots 18 and are shifted to the radial outer side of the stator core 10. Then, an inner side edge 35a of the retaining piece 35 is brought into contact with tapered portions 62 of the projecting portions 61 of the wedges 60.

The dimension of the sheet body portion 32 in the inward-outward direction is slightly longer than the distance between the inserted U-phase coils 11u and the wedges 60. Hence, when the retaining piece 35 is brought into contact with ends of the wedges 60, the sheet body portion 32 is bent, and the retaining piece 35 is retained by the projecting portions 61 of the wedges 60 by resilient force with which the bent sheet body portion 32 returns to a flat shape. In other words, the retaining piece 35 is supported by the bridge portions 33, and is clamped between the projecting portions 61 of the wedges 60 and the U-phase coils 11u inserted in the slots 18. Further, since the retaining piece 35 contacts with the tapered portions 62 of the wedges 60 and presses the wedges 60 with resilient force, the inner side edge 35a of the retaining piece 35 is caught in toward the end face 21 of the stator core 10 along the tapered portions 62. Thus, retention failure is unlikely to occur and easy retention is possible. A retaining piece 34 of a sheet body portion 31 is retained similarly to the above-described retaining piece 35 of the sheet body portion 32.

Figure 9:
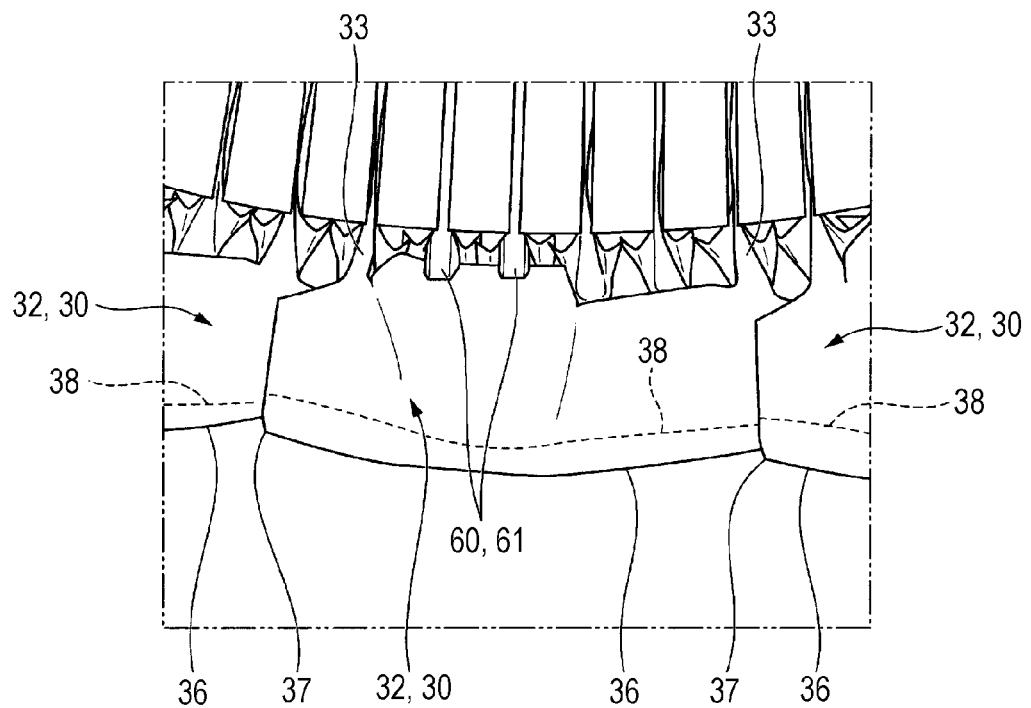
FIG. 9 is a perspective view illustrating a state in which interphase insulation sheets are arranged in a circumferential direction of the stator core.

As illustrated in FIG. 9, a plurality of interphase insulation sheets 30 are attached all around the circumference of the stator core 10 in a procedure similar to the above-described procedure. At this time, adjacent interphase insulation sheets 30 are attached to slightly overlap with each other in the circumferential direction, and outer sides in the rotation axis direction of the coil ends 22u of the U-phase coils 11u are entirely covered with the interphase insulation sheets 30. Next, V-phase coils 11v are inserted in the stator core 10.

Although not illustrated here, in the stator 1 of the embodiment, two V-phase coils 11v are inserted in two slots 18 shifted to one side (right side in the figure) in the circumferential direction from the slots 18 in which the above-described U-phase coils 11u are inserted, and coil ends 22v of the V-phase coils 11v are routed at a distance from each other in the circumferential direction, similarly to the U-phase coils 11u. Then, the coil ends 22v of the V-phase coils 11v inserted in the slots 18, which are next to the slots 18 in which the U-phase coils 11u are inserted, are routed across the retaining pieces 34 and 35 of the above-described sheet body portions 31 and 32 in the circumferential direction. After the V-phase coils 11v are inserted, wedges 60 are attached in the slots 18 in which the V-phase coils 11v are inserted, and interphase insulation sheets 40 are attached to the stator core 10 so that folded portions 46 cover the coil ends 22v of the V-phase coils 11v, similarly to the interphase insulation sheets 30. At this time, retaining pieces 44 and 45 of the interphase insulation sheets 40 are each retained by contact with projecting portions 61 of four wedges 60, that is, the above-described two wedges 60 by which the retaining pieces 34 and 35 of each interphase insulation sheet 30 are retained and two added wedges 60. The retaining pieces 44 and 45 of the interphase insulation sheets 40 are also retained by resilience due to bending, similarly to the retaining pieces 34 and 35 of the interphase insulation sheets 30.

Figure 10:
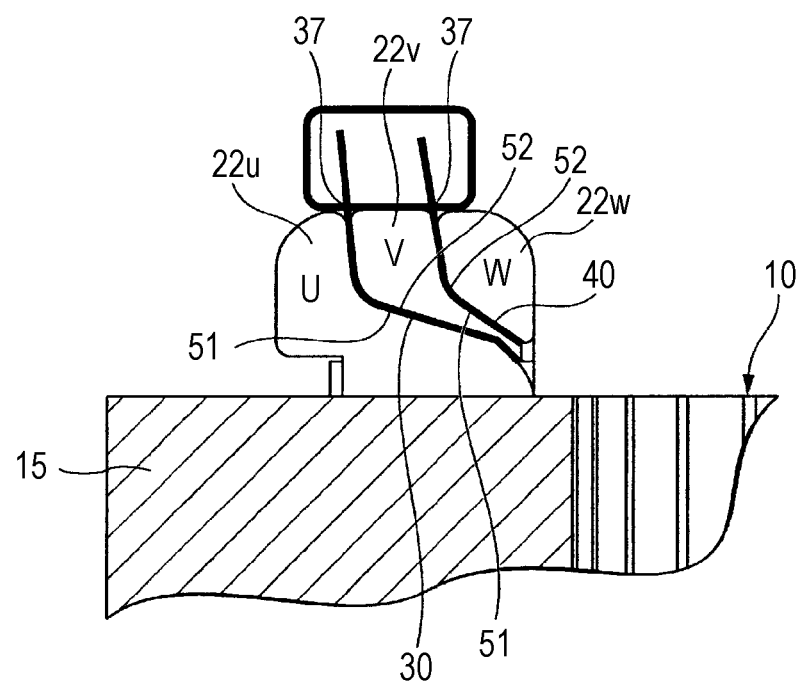
FIG. 10 is a longitudinal sectional view of coil ends of different phases that are subjected to compression forming.

After that, W-phase coils 11w are inserted in the slots 18. As illustrated in FIG. 10, the coil ends 22u, 22v, and 22w of the U-phase coils 11u, V-phase coils 11v, and W-phase coils 11w are subjected to compression forming, and portions of the coil ends 22u, 22v, and 22w on the outer sides in the rotation axis direction (portions enclosed by a bold line in FIG. 10) protruding from the perforations 38 and 47 of the interphase insulation sheets 30 and 40 are cut off. After that, the coil ends 22u, 22v, and 22w are entirely coated with varnish in a post process.

Varnish coating prevents vibration of the U-phase coils 11u, V-phase coils 11v, and W-phase coils 11w during the application of current so as to reduce damage. Varnish also closes pinholes of insulation coatings provided beforehand on the U-phase coils 11u, V-phase coils 11v, and W-phase coils 11w, thereby ensuring insulation. A conductive wire of each of the U-phase coils 11u, V-phase coils 11v, and W-phase coils 11w has one pin hole within a distance of 1 m or less (JIS standard).

Therefore, according to the stator 1 of the above-described embodiment, the projecting portions 61 of the wedges 60 retain the retaining pieces 34, 35, 44, and 45 provided in the sheet body portions 31, 32, 41, and 42 of the interphase insulation sheets 30 and 40. Hence, isolation between the adjacent coil ends 22u and 22v of different phases and isolation between the adjacent coil ends 22v and 22w of the different phases can be ensured, and the tact time can be shortened by omitting the bonding step of the interphase insulation sheets and the folding step of the nose portions in the related art.

Further, since the interphase insulation sheets 30 and 40 can be positioned along the shapes of the coil ends 22u and 22v located on the outer sides of the end faces 21 of the stator core 10 by simply inserting the bridge portions 33 in the slots 18, they can be prevented from being displaced when the V-phase coils 11v and the W-phase coils 11w are inserted in the slots 18.

Since the interphase insulation sheets 30 and 40 can conform to the outer shapes of the coil ends 22u and 22v located on the outer sides of the end faces 21 of the stator core 10, particularly when the V-phase coils 11v and the W-phase coils 11w are inserted in the slots 18 from one end face 21 by machine winding, the interphase insulation sheets 30 and 40 can be prevented from being caught in the V-phase coils 11v, the W-phase coils 11w, and a guide blade of the winding machine passing through the inner periphery of the stator 1. As a result, the coil ends 22u, 22v, and 22w of different phases can be isolated more reliably.

When a plurality of interphase insulation sheets 30 and 40 are arranged adjacent to each other in the circumferential direction of the stator core 10, the adjacent folded portions 36 and the end portions 47 of the adjacent folded portions 46 are shifted from each other in the radial direction because the folding lines of the folded portions 36 and 46 are inclined, as illustrated in FIG. 9. This prevents interference therebetween.

Hence, the interphase insulation sheets 30 and 40 can keep conforming to the outer shapes of the coil ends 22u and 22v. As a result, it is possible to more reliably prevent the interphase insulation sheets 30 and 40 from being caught in the V-phase coils 11v and the W-phase coils 11w.

Since the projecting portions 61 of the wedges 60 have the tapered portions 62, when the retaining pieces 34, 35, 44, and 45 of the sheet body portions 31, 32, 41, and 42 are retained by the projecting portions 61 in a manner such as to be caught toward the end faces 21, that is, in an inward direction. This allows the retaining pieces 34, 35, 44, and 45 to be retained easily and reliably. Hence, the interphase insulation sheets 30 and 40 can be easily positioned relative to the coil ends 22u and 22v.

When the V-phase coils 11v are inserted in the slots 18, since the frictional coefficient of the outer faces of the functional layers 51 thereof to be in contact with the coil ends 22u of the U-phase coils 11u inserted earlier is high, the interphase insulation sheets 30 can be prevented from being displaced when the coil ends 22v of the V-phase coils 11v inserted later move. Similarly, when the W-phase coils 11w are inserted in the slots 18, since the frictional coefficient of the outer faces of the functional layers 51 thereof to be in contact with the coil ends 22v of the V-phase coils 11v inserted earlier is high, the interphase insulation sheets 40 can be prevented from being displaced when the coil ends 22w of the W-phase coils 11w inserted later move.

After the U-phase coils 11u, the V-phase coils 11v, and the W-phase coils 11w are inserted in the slots 18, the outer portions of the sheet body portions 32 and 42, which do not contribute to isolation between the coil ends 22u, 22v, and 22w of the different phases, can be cut off. Hence, radiation performance can be enhanced when the U-phase coils 11u, V-phase coils 11v, and W-phase coils 11w are energized, and permeation failure of varnish can be avoided in the post process.

In addition, while the U-phase coils 11u, the V-phase coils 11v, and the W-phase coils 11w are inserted by machine winding in the stator 1 of the above-described embodiment, they are pushed in by the guide blade (not illustrated) set on the inner periphery of the stator core 10 in the case of machine winding. Hence, the retaining pieces 35 and 45 particularly located on the insertion side of the V-phase coils 11v and the W-phase coils 11w are reliably retained by the ends of the wedges 60. Thus, the interphase insulation sheets 30 and 40 do not protrude to the inner periphery of the stator core 10 and are not caught by the guide blade of the winding machine. This prevents the interphase insulation sheets 30 and 40 from breakage.

The present invention is not limited to the above-described embodiment, and design variations can be made without departing from the scope of the invention.

For example, while the projecting portions 61 have the tapered portions 62 in the stator 1 of the above-described embodiment, they may have no tapered portions 62 as long as they have a shape capable of retention.

Further, while the folded portions 36 and 46 are inclined in the above-described embodiment, they do not always need to be inclined.

While the U-phase coils 11u, the V-phase coils 11v, and the W-phase coils 11w are wound around the teeth 16 by machine winding, they may be manually wound therearound. Since the U-phase coils 11u, the V-phase coils 11v, and the W-phase coils 11w are inserted from the radial inner side of the stator core 10 in manual winding, it may be possible to omit the folded portions 36 and 46 and the perforations 38 and 48 provided in the sheet body portions 32 and 42 in machine winding.

In addition, while the frictional coefficient of one of the two functional layers 51 and 52 of each of the interphase insulation sheets 30 and 40 closer to the coil end of the coil inserted earlier is set to be higher in the embodiment, the functional layers 51 and 52 may have equivalent frictional coefficients.

Obviously, numerous modifications and variations of the present invention are possible in light of the above teachings. It is therefore to be understood that within the scope of the appended claims, the invention may be practiced otherwise than as specifically described herein.

What is claimed is:

1. A stator comprising:
    a stator core having a plurality of teeth;
    slots provided between the teeth;
    coils having a plurality of phases, each of the coils being wound in the slots;
    an interphase insulation sheet provided between coil ends of adjacent coils having different phases among the coils; and
    wedges provided in the slots on an inner peripheral side of the stator core,
    wherein each of the wedges has projecting portions protruding from first and second end faces of the stator core in a rotation axis direction,
    wherein the interphase insulation sheet includes a first sheet body portion, a second sheet body portion, and a first bridge portion, the first sheet body portion being provided on an outer side of the first end face of the stator core in the rotation axis direction, the second sheet body portion being provided on an outer side of the second end face of the stator core in the rotation axis direction, the first bridge portion linking the first sheet body portion to the second sheet body portion,
    wherein the first and second sheet body portions have first and second retaining pieces respectively provided in opposing inner portions of the first and second sheet body portions in a developed state of the interphase insulation sheet, the first retaining piece projecting from the first sheet body portion toward the second sheet body portion in the developed state of the interphase insulation sheet, the second retaining piece projecting from the second sheet body portion toward the first sheet body portion in the developed state of the interphase insulation sheet,
    wherein a width of each of the first and second retaining pieces in a circumferential direction of the stator is greater than a circumferential distance between slots which are adjacent to each other in the circumferential direction, and
    wherein the first and second retaining pieces are retained by the projecting portions of the wedges when the first and second sheet body portions are attached to the stator core to cover the coil ends, the first and second retaining pieces being provided to extend across at least two wedges which are provided in slots which are adjacent to each other in the circumferential direction.

2. The stator according to claim 1, wherein the second sheet body portion has a folded portion folded toward the second end face of the stator core, the folded portion being provided on an outer peripheral side of the second sheet body portion.

3. The stator according to claim 1, wherein the projecting portions of each of the wedges have tapered portions that decrease in length from the inner peripheral side toward an outer peripheral side of the stator core.

4. The stator according to claim 1, wherein the interphase insulation sheet includes a first surface and a second surface, the first surface being in contact with the coil end of a coil inserted earlier, the second surface being in contact with the coil end of a coil inserted later, a frictional coefficient of the first surface being higher than a frictional coefficient of the second surface.

5. The stator according to claim 1, wherein the second sheet body portion has an easily breakable line that allows easy cutting of portions which are not used for insulation between the coils of the phases.

6. The stator according to claim 1, wherein
the interphase insulation sheet further includes a second bridge portion linking the first sheet body portion to the second sheet body portion, and
the first and second retaining pieces are disposed between the first and second bridge portions in a circumferential direction of the stator core.

7. The stator according to claim 1, wherein
the first and second retaining pieces are configured to be in direct contact with the at least two wedges that the first and second retaining pieces extend across and that are provided in slots which are adjacent to each other in the circumferential direction.

8. A stator comprising:
a stator core having a plurality of teeth;
slots provided between the teeth;
coils having a plurality of phases, each of the coils being wound in the slots;
an interphase insulation sheet provided between coil ends of adjacent coils having different phases among the coils; and
wedges provided in the slots on an inner peripheral side of the stator core,
wherein each of the wedges has projecting portions protruding from first and second end faces of the stator core in a rotation axis direction,
wherein the interphase insulation sheet includes a first sheet body portion, a second sheet body portion, and a first bridge portion, the first sheet body portion being provided on an outer side of the first end face of the stator core in the rotation axis direction, the second sheet body portion being provided on an outer side of the second end face of the stator core in the rotation axis direction, the first bridge portion linking the first sheet body portion to the second sheet body portion,
wherein the first and second sheet body portions have first and second retaining pieces respectively provided in opposing inner portions of the first and second sheet body portions in a developed state of the interphase insulation sheet, the first retaining piece projecting from the first sheet body portion toward the second sheet body portion in the developed state of the interphase insulation sheet, the second retaining piece projecting from the second sheet body portion toward the first sheet body portion in the developed state of the interphase insulation sheet,
wherein the first and second retaining pieces are retained by the projecting portions of the wedges when the first and second sheet body portions are attached to the stator core to cover the coil ends,
wherein the second sheet body portion has a folded portion folded toward the second end face of the stator core, the folded portion being provided on an outer peripheral side of the second sheet body portion, and
wherein the folded portion is inclined such that one end of the folded portion in a circumferential direction of the stator core is shifted from another end of the folded portion in a radial direction of the stator core.

9. The stator according to claim 8, wherein the projecting portions of each of the wedges have tapered portions that decrease in length from the inner peripheral side toward an outer peripheral side of the stator core.

10. The stator according to claim 8, wherein the interphase insulation sheet includes a first surface and a second surface, the first surface being in contact with the coil end of the coil inserted earlier, the second surface being in contact with the coil end of the coil inserted later, a frictional coefficient of the first surface being higher than a frictional coefficient of the second surface.

11. The stator according to claim 8, wherein the second sheet body portion has an easily breakable line that allows easy cutting of portions which are not used for insulation between the coils of the phases.

12. The stator according to claim 8, wherein
the interphase insulation sheet further includes a second bridge portion linking the first sheet body portion to the second sheet body portion, and
the first and second retaining pieces are disposed between the first and second bridge portions in a circumferential direction of the stator core.

* * * * *